Patented Jan. 8, 1952

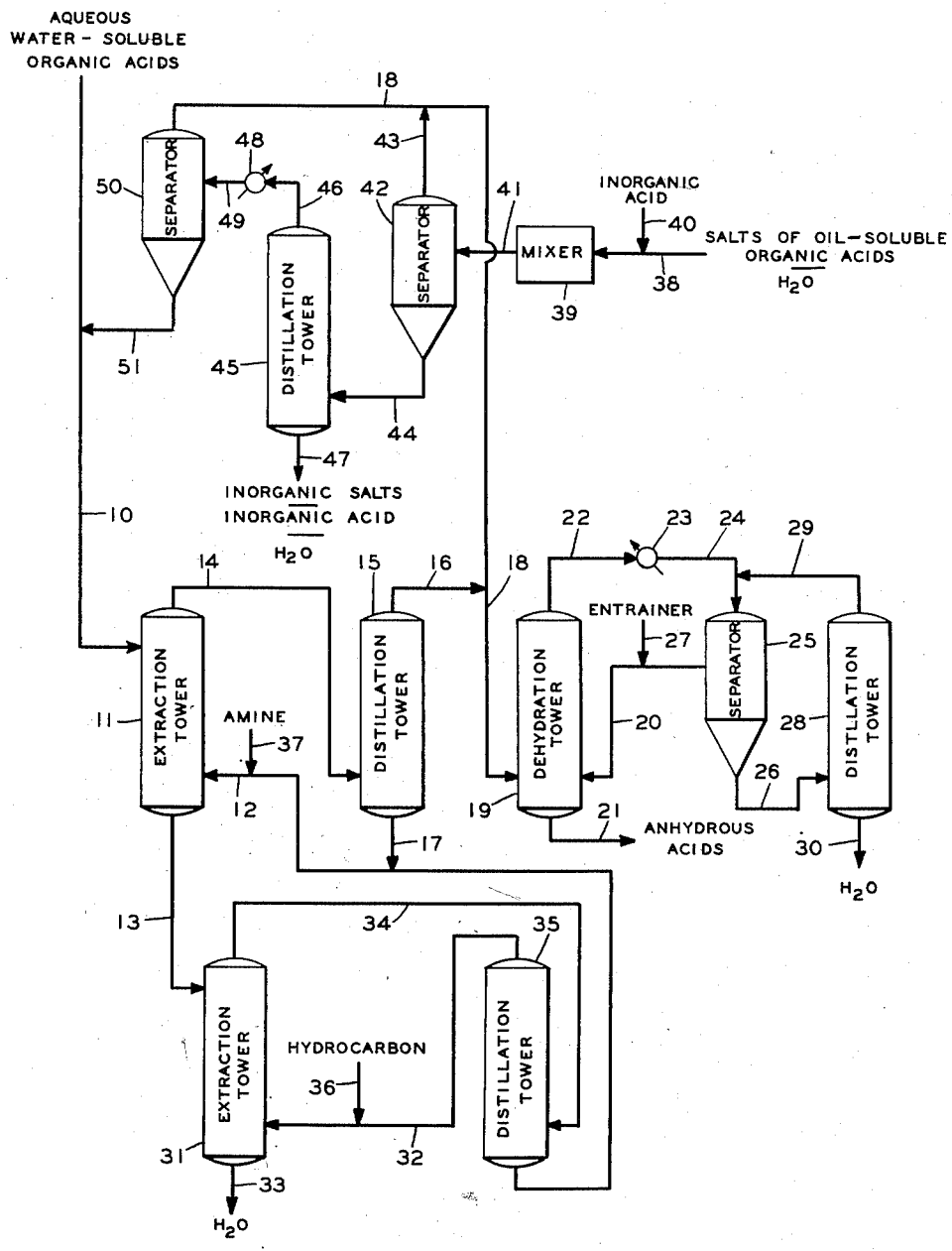
INVENTOR
ERNEST SOLOMON

2,581,452

UNITED STATES PATENT OFFICE 2,581,452

DEHYDRATION OF ORGANIC ACIDS

Ernest Solomon, Nutley, N. J., assignor to The M. W. Kellogg Company, Jersey City, N. J., a corporation of Delaware Application March 29, 1947, Serial No. 738,176

14 Claims. (Cl. 260—419)

This invention relates to the dehydration of organic acids and relates more particularly to an improved process for the dehydration of water-soluble fatty organic acids by selective solvent extraction. Still more particularly the invention relates to the dehydration of water-soluble fatty organic acids, separated from the aqueous and non-aqueous liquid phases obtained from the condensation of reactor gases produced in the catalytic hydrogenation of oxides of carbon at elevated temperatures.

In the hydrogenation of oxides of carbon in the presence of a reducible metal catalyst at elevated temperatures, a reaction product is obtained in the form of reactor gases at temperatures falling between about 300° F. to about 700° F. and containing oxygenated organic compounds, a substantial portion of which comprises organic acids. These gases are passed through one or more condensation zones in which they are cooled to temperatures within the range from about 40° F. to about 150° F., to effect separation of the resulting condensate into a water phase and an oil phase. Both phases contain organic acids in admixture with other oxygenated compounds, acids of lower molecular weight tending to remain in the water phase, and acids of higher molecular weight tending to remain in the oil or non-aqueous liquid phase. The aqueous water-soluble organic acids present in the water phase, may be next separated from other oxygenated compounds present therein, by procedures outside the scope of the present process. Similarly, oil-soluble organic acids present in the oil or non-aqueous liquid phase, may be subjected to alkali treatment to effect their removal as their corresponding alkali salts in aqueous solution, by procedures which are also outside the scope of the present process.

Heretofore, various methods have been proposed for dehydration of water-soluble fatty organic acids from their aqueous solutions. The more commonly used methods, utilizing such extraction media as ethyl ether, isopropyl ether, isopropyl chloride, ethyl actate and the like, have at times proved to be costly in the past. Such conditions are often encountered where dehydration of water-soluble fatty organic acids in dilute aqueous solutions by means of the aforementioned solvents is attempted. The chief disadvantage inherent in the use of solvents of the aforementioned types lies in their being more volatile than any of the fatty acids to be dehydrated. This necessitates, therefore, the removal of the solvent from the resulting extract by distillation. This is particularly disadvantageous in the case of dilute aqueous solutions of water-soluble fatty organic acids, inasmuch as in such instances the ratio of solvent used to anhydrous acids recovered is large, making it necessary to distill large amounts of solvent per unit of acids recovered.

The present invention is directed to a process, as more fully hereinafter described, for dehydrating water-soluble fatty organic acids, either individually or in mixtures thereof, from their aqueous solution by selective solvent extraction, wherein the solvent is an organic compound having slightly basic characteristics, a boiling point higher than the highest boiling acid to be dehydrated, is insoluble in water and soluble in hydrocarbons. I have found that such a solvent may be a high molecular weight alkyl amine or an aromatic amine, either individually or in mixtures thereof, which satisfy the above mentioned requirements. In this respect I have found such alkyl amines as tributylamine or triamylamine to be satisfactory. Aromatic amines, such as quinoline and dimethylaniline, either individually or in mixtures thereof, have been found to be especially suitable when employed as a solvent for the dehydration of fatty organic acids, as derived in the aforementioned catalytic hydrogenation of oxides of carbon at elevated temperatures.

By subjecting the aforementioned water-soluble fatty organic acids in aqueous solution to extraction with one or more of the aforementioned solvent treating agents, the extract thus obtained is stripped free of acids which are next subjected to dehydration, so that anhydrous light and heavy acids may be subsequently recovered. Relatively small quantities of the solvent in aqueous solution, obtained as the raffinate in the initial extraction step, are next recovered by further extraction with a second solvent, such as one or more light hydrocarbons. This hydrocarbon-solvent is subsequently stripped from the basic-solvent and the separated hydrocarbon-solvent and basic-solvent returned to their respective circuits. The term "basic-solvent" is used throughout this application to indicate any organic solvent possessing the aforementioned characteristics, and where in the embodiment cited for purposes of illustration only, comprises one or more amines.

It is therefore an object of the present invention to provide an improved process for dehydrating water-soluble fatty organic acids from their aqueous solutions by selective solvent extraction.

Another object of the invention is to provide an improved process for dehydrating water-soluble fatty organic acids from their aqueous solutions, by solvent extraction with a solvent having slightly basic characteristics.

Still another object of the invention is to provide an improved process for dehydrating water-soluble fatty organic acids from their aqueous solutions by solvent extraction, economically and efficiently.

Other objects and advantages inherent in the invention, will be apparent from the following more detailed disclosure.

The accompanying drawing illustrates, diagrammatically, one form of the apparatus employed and capable of carrying out one embodiment of the process of this invention. While the invention will be described in detail by reference to one embodiment of the process employing the apparatus illustrated in the drawing, it should be noted that it is not intended that the invention be limited to the embodiment as illustrated, but is capable of other embodiments beyond the scope of the apparatus illustrated in the drawing. Pumps, compressors, valves and other mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, an aqueous solution of one or more water-soluble fatty organic acids is supplied through line 10. This mixture is transferred through line 10 to an upper point in an extraction tower 11. In tower 11 the aqueous acid solution thus introduced through line 10, is subjected to intimate countercurrent contact with a basic-solvent treating agent, which comprises one or more amines having the previously described characteristics. The basic-solvent treating agent thus employed, is introduced at a low point in tower 11, through line 12.

The treating agent and the aqueous acid solution introduced into tower 11 through line 10, are contacted in this tower under conditions effective to absorb in the treating agent, substantially all of the acids contained in the aforementioned aqueous acid solution, and thus separate these acids from water present. As a result of such treatment, a lower water-rich layer containing small quantities of solvent treating agent and an upper acid-rich layer containing the solvent treating agent and minor quantities of water, are formed in tower 11. The lower water-rich layer is withdrawn as a raffinate from tower 11 through line 13 for further treatment in the process hereinafter described. The upper acid-rich layer is withdrawn overhead through line 14.

The upper acid-rich layer from tower 11, comprising an extract containing substantially all of the organic acids in aqueous solution introduced into tower 11 through line 10, the solvent treating agent and minor quantities of water are next transferred through line 14 to a distillation tower 15, which functions as an acid stripper. In tower 15, the mixture thus introduced through line 14 is heated under conditions of temperature and pressure effective to distill overhead substantially all of the organic acids and minor quantities of water, which are withdrawn through line 16. Bottoms from tower 15, comprising acid-free solvent, are withdrawn through line 17 and transferred, via line 12 with which line 17 connects, for further use as the solvent treating agent in tower 11 in the process described above.

The overhead distillates from tower 15, comprising a mixture of substantially all of the organic acids present in the aqueous solution introduced into tower 11 through line 10 and minor quantities of water, are next subjected to dehydration. Conveniently, this may be accomplished by transferring these overheads through line 16, via line 18 with which line 16 connects, to a dehydration tower 19. An entraining agent such as ethyl ether, isopropyl ether, trichloroethylene and the like, is therefore introduced into tower 19 through line 20. Inasmuch as the acids to be dehydrated in tower 19 contain only minor quantities of water, as stated above, proportionately small quantities of an entraining agent will be required to effect complete acid-dehydration. Tower 19 is next heated under conditions effective to obtain water-free acids as bottoms, which are withdrawn through line 21 and may be subjected to further distillation for recovery of individual acids by transfer to any conventional acid recovery system, not shown in the drawing.

The overheads from tower 19 comprise the water-containing azeotropes of the entraining agent, and are withdrawn as vapors through line 22. These overheads are next transferred through line 22 to a condenser 23. Condenser 23 is provided to liquefy the normally liquid components withdrawn as overheads from tower 19. The entraining agent and water thus liquefied, are transferred from condenser 23, through line 24, to a separator 25. In separator 25 the mixture thus introduced through line 24, is separated into an upper layer comprising substantially the entraining agent, which is withdrawn through line 29, and a lower water layer containing small quantities of the entraining agent which is withdrawn through line 26. The upper layer from separator 25, comprising substantially the entraining agent, is recycled through line 29 to a low point in tower 19, for further use as the entraining agent in the process described above. Make-up quantities of the entraining agent are introduced into line 20 through line 27, with which line 20 connects.

As described above, the lower water layer from separator 25 containing small quantities of the entraining agent, is withdrawn through line 26. This layer is next transferred through line 26 to a low point in a distillation tower 28. Tower 28 is heated under conditions of temperature and pressure effective to distill overhead substantially all of the entraining agent present in the water layer introduced through line 26. These overheads are withdrawn through line 29 and recycled into separator 25 through line 24, with which line 29 connects, for further use as the entraining agent in tower 19, in the process described above. Water separated in tower 28, is withdrawn as bottoms through line 30 for further use or treatment outside the scope of the present process.

As hereinbefore described, the lower water-rich layer from tower 11, containing small quantities of the solvent treating agent introduced through line 10, is withdrawn as a raffinate through line 13. This raffinate is next transferred through line 13 to an upper point in an extraction tower 31. In tower 31 this water-rich layer, containing the aforementioned basic-solvent initially introduced into tower 11 through line 12, which may be an amine, is subjected to intimate countercurrent contact with a hydrocarbon solvent treating agent, which is introduced into tower 31 through line 32. This solvent treating agent may comprise a hydrocarbon or a mixture of hydrocarbons, boiling at a lower temperature than the solvent treating agent introduced into tower 11, through line 12, so that azeotropic formation may be avoided. While the use of a hydrocarbon, or a mixture of hydrocarbons, as a solvent treating agent in the process described, has been found to be overall generally satisfactory, other solvents may be effectively employed. For example, I may employ such solvents as ethyl ether, or trichloroethylene. A hydrocarbon or a mixture of hydrocarbons as a solvent of the character described, is preferred inasmuch as its relatively low cost, when compared to other solvents, will obviate the necessity for its subsequent recovery from the water layer in tower 31 in the process hereinafter described.

The hydrocarbon treating agent and the aqueous basic-solvent introduced into tower 31 through line 13, as described above, are contacted in this tower under conditions effective to absorb in the hydrocarbon treating agent, substantially all of the basic-solvent contained in the aforementioned water-rich layer, and thus separate the basic-solvent from water present. As a result of such treatment, an upper basic-solvent layer, substantially water-free, and a lower water layer, are formed in tower 31. The lower water layer from tower 31 is withdrawn as bottoms through line 33. The upper hydrocarbon-basic-solvent layer from tower 31, is next transferred through line 34 to a low point in a distillation tower 35, which functions as a solvent stripper. Tower 35 is heated under conditions of temperature and pressure effective to distill overhead substantially all of the hydrocarbon treating agent present in the hydrocarbon-basic-solvent mixture introduced through line 34. These overheads are withdrawn and recycled through line 32 for further use as the hydrocarbon solvent in tower 31, in the process described above. Make-up quantities of hydrocarbon solvent treating agent are introduced into line 32 through line 36, with which line 32 connects. Bottoms from tower 35, comprising the basic-solvent, hydrocarbon-free, are withdrawn through line 12, and may be recycled into tower 11 through this line as the basic-solvent treating agent in tower 11, in the process hereinbefore described. Make-up quantities of the basic-solvent treating agent are introduced into tower 11 through line 37, via line 12, with which line 37 connects.

As previously described, aqueous solutions of salts of oil-soluble fatty organic acids may be obtained, by subjecting organic acids present in the oil phase as obtained in the aforementioned catalytic hydrogenation of oxides of carbon, to alkali treatment. These solutions may be next introduced through line 38 and transferred to a mixer 39. Mixer 39 is provided to intimately mix the solution introduced through line 38, with an inorganic acid which is introduced into line 38, through line 40, in order to effect neutralization of the salts of the organic acids. The inorganic acid thus introduced into mixer 39, may be a high-boiling inorganic acid having a boiling point higher than that of water, such as sulfuric acid, or an inorganic acid which forms a maximum boiling azeotrope with water, such as hydrochloric acid.

The resulting aqueous mixture from mixer 39, comprises free organic acids and salts of the introduced inorganic acid. This mixture is withdrawn from mixer 39, through line 41, and transferred to a separator 42. In separator 42 heavier organic acids will separate from the water solution by reason of their insolubility. They will also contain a portion of the lighter water-soluble fatty organic acids by reason of the solvent action of the heavier acids on the lighter acids. These acids, comprising an upper acid-rich phase in separator 42, are withdrawn overhead through line 43 and transferred via line 18, with which line 43 connects, for dehydration and subsequent recovery of anhydrous acids in tower 19 in the process hereinbefore described.

The lower water-rich phase in separator 14, comprising inorganic salts, the introduced inorganic acid and remaining lighter organic acids, is withdrawn as bottoms from separator 42 through line 44. This lower water-rich phase is then transferred through line 44 to a low point in a distillation tower 45, which functions as an acid stripper. Tower 45 is heated under conditions effective to distill overhead organic acids as their azeotropes which are withdrawn as vapors through line 46. Bottoms from tower 45 comprising inorganic salts, excess quantities of the introduced inorganic acid and excess water are withdrawn through line 47 for further use or treatment outside the scope of the present process.

The overheads from tower 46, comprising water-soluble fatty organic acids as their azeotropes in the vapor state, are next transferred through line 46 to a condenser 48. Condenser 48 is provided to liquefy the normally liquid components withdrawn as overheads from tower 45. Acids thus liquefied are transferred from condenser 48, via line 49 to a separator 50. In separator 50 the mixture thus introduced through line 49, is separated into a lower water-rich phase and an upper acid-rich phase. The upper acid-rich phase is transferred from separator 50, via line 18, for subsequent dehydration in tower 19, in the process hereinbefore described. The lower water-rich phase, containing water-soluble fatty organic acids, is withdrawn through line 51 and transferred via line 10, with which line 51 connects, into tower 11 for further treatment in the process hereinbefore described.

To recapitulate, the present invention is directed to an improved process for dehydrating water-soluble fatty organic acids, either individually or in mixtures thereof, from their aqueous solutions by selective solvent extraction. In accordance with the foregoing description, the advantages inherent in this process will be apparent when compared with other methods for obtaining similar acid-dehydration, in that, a highly efficient solvent is employed which is less volatile than the acids to be dehydrated, making it possible, subsequently, to confine distillation to the recovered acids rather than the solvent treating agent.

While a particular embodiment of the invention has been described for purposes of illustration, it should be noted that various modifications or adaptations thereof, which will be obvious to one skilled in the art, may be made within the spirit of the invention and as set forth in the appended claims.

Having thus described my invention, what I claim and desire to secure by Letters Patent is:

1. A process for the dehydration of an aqueous solution of a fatty organic acid which comprises contacting said solution with at least one compound selected from the group consisting of the alkyl amines and alkylated aromatic amines whose boiling point is higher than that of the acid to be dehydrated and which is insoluble in water to produce an extract phase and a raffinate phase, and separating said phases.

2. A process for the dehydration of an aqueous solution of a fatty organic acid which comprises contacting said solution with at least one compound selected from the group consisting of the alkyl amines and alkylated aromatic amines whose boiling point is higher than that of the acid to be dehydrated and which is insoluble in water to produce an extract phase and a raffinate phase, separating said phases, recovering said amine, and returning the recovered amine for further contact with more of said aqueous solution.

3. A process for the dehydration of an aqueous solution of a fatty organic acid which comprises contacting said solution with a first solvent comprising at least one compound selected from the group consisting of the alkyl amines and alkylated aromatic amines whose boiling point is higher than that of the acid to be dehydrated and which is insoluble in water to produce a first extract phase comprising said acid, a major portion of said first solvent and a minor portion of water, and a first raffinate phase comprising a water-rich mixture containing a minor portion of said first solvent and said acid, separating said phases, recovering said first solvent from said first extract phase, dehydrating the solvent-free remainder of said first extract phase to obtain the acid contained therein substantially water-free, contacting said first raffinate phase with a second solvent whose boiling point is lower than that of said first solvent and in which said first solvent is soluble to produce a second extract phase comprising said first and second solvents, and a second raffinate phase comprising water, separating said last-mentioned phases, recovering said first solvent from said second extract phase, and returning the recovered first solvent from said first and second extract phases for further contact with more of said aqueous solution.

4. A process as defined in claim 3 wherein said first solvent is tributylamine.

5. A process as defined in claim 3 wherein said first solvent comprises an alkylated alkyl amine.

6. A process as defined in claim 3 wherein said first solvent comprises an alkylated aromatic amine.

7. A process as defined in claim 3 wherein said first solvent comprises quinoline.

8. A process as defined in claim 3 wherein said first solvent comprises dimethylaniline.

9. A process as defined in claim 3 wherein said second solvent is a hydrocarbon.

10. A process as defined in claim 3 wherein said second solvent is ethyl ether.

11. A process as defined in claim 3 wherein said second solvent is trichloroethylene.

12. In a process for the catalytic hydrogenation of an oxide of carbon in which is obtained a water-rich solution of a fatty organic acid, the process for the dehydration of said solution which comprises contacting said solution with a first solvent comprising at least one compound selected from the group consisting of the alkyl amines and alkylated aromatic amines whose boiling point is higher than that of the acid to be dehydrated and which is insoluble in water to produce a first extract phase comprising said acid, a major portion of said first solvent and a minor portion of water, and a first raffinate phase comprising a water-rich mixture containing a minor portion of said first solvent and said acid, separating said phases, recovering said first solvent from said first extract phase, dehydrating the solvent-free remainder of said first extract phase to obtain the acid contained therein substantially water-free, contacting said first raffinate phase with a second solvent whose boiling point is lower than that of said first solvent and in which said first solvent is soluble to produce a second extract phase comprising said first and second solvents, and a second raffinate phase comprising water, separating said last-mentioned phases, recovering said first solvent from said second extract phase, and returning the recovered first solvent from said first and second extract phases for further contact with more of said solution.

13. A process for the dehydration of an aqueous solution of a fatty organic acid which comprises contacting said solution with a first solvent comprising at least one compound selected from the group consisting of the alkyl amines and alkylated aromatic amines whose boiling point is higher than that of the acid to be dehydrated and which is insoluble in water to produce a first extract phase comprising said acid, a major portion of said first solvent and a minor portion of water, and a first raffinate phase comprising a water-rich mixture containing a minor portion of said first solvent and said acid, separating said phases, contacting said first raffinate phase with a second solvent whose boiling point is lower than that of said first solvent and in which said first solvent is soluble to produce a second extract phase comprising said first and second solvents and a second raffinate phase comprising water, and separating said last-mentioned phases.

14. In a process for the catalytic hydrogenation of an oxide of carbon in which is obtained a water-rich solution of a fatty organic acid, the process for the dehydration of said solution which comprises contacting said solution with a first solvent comprising at least one compound selected from the group consisting of the alkyl amines and alkylated aromatic amines whose boiling point is higher than that of the acid to be dehydrated and which is insoluble in water to produce a first extract phase comprising said acid, a major portion of said first solvent and a minor portion of water, and a first raffinate phase comprising a water-rich mixture containing a minor portion of said first solvent and said acid, separating said phases, contacting said first raffinate phase with a second solvent whose boiling point is lower than that of said first solvent and in which said first solvent is soluble to produce a second extract phase comprising said first and second solvents, and a second raffinate phase comprising water, and separating said last-mentioned phases.

ERNEST SOLOMON.

REFERENCES CITED

The following references are of record in the file of this patent:

UNITED STATES PATENTS

| Number | Name | Date |
|---|---|---|
| 1,952,845 | Dreyfus | Mar. 27, 1934 |
| 2,275,862 | Othmer | Mar. 10, 1942 |
| 2,357,344 | Morris et al. | Sept. 25, 1944 |
| 2,360,859 | Evans et al. | Oct. 24, 1944 |

OTHER REFERENCES

Markley, Fatty Acids (1947) Interscience Pub., pages 176 to 178.